Oct. 14, 1941.                S. S. CRAMER                    2,259,297
              FABRICATING MACHINE SAFETY CLUTCH
                    Filed July 27, 1940            2 Sheets-Sheet 1
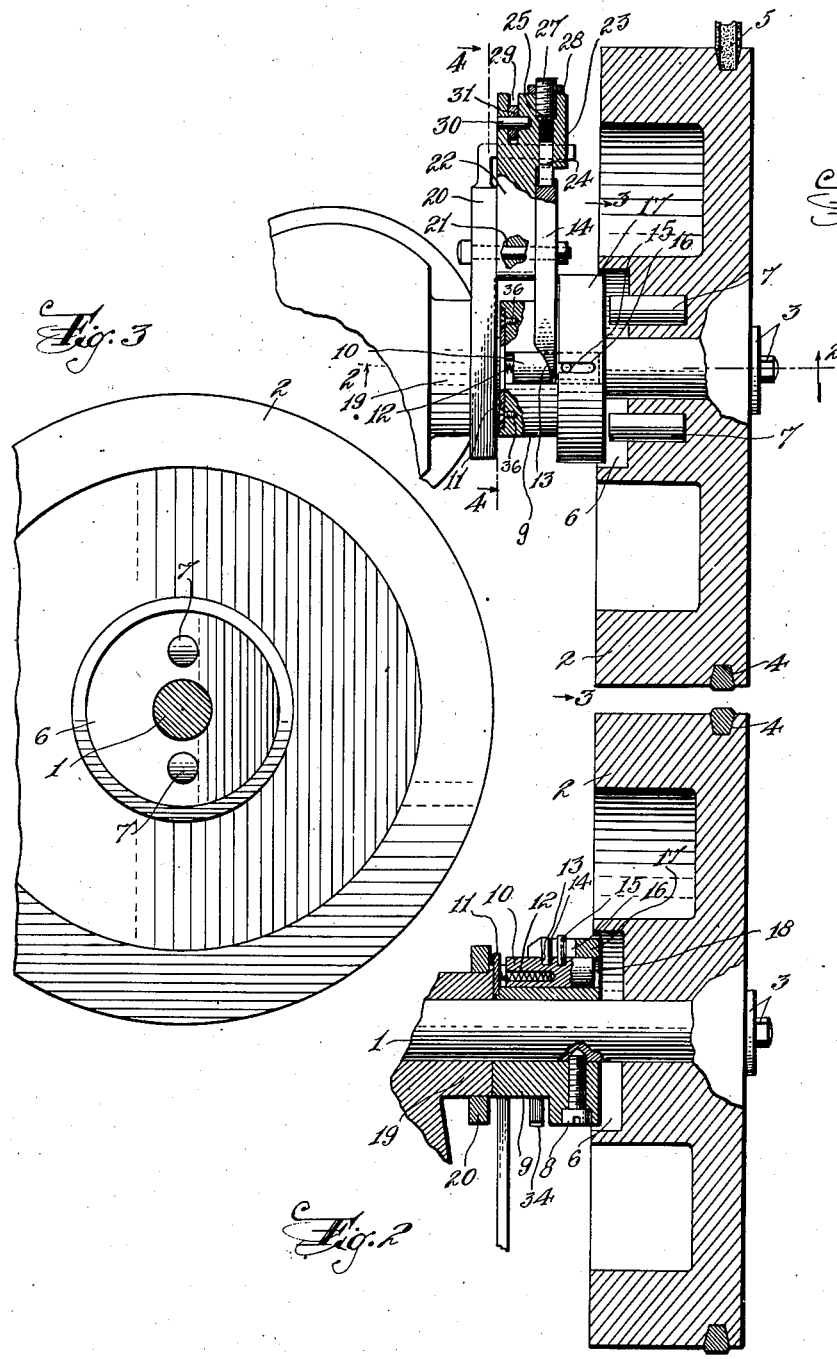
INVENTOR
Stanley S. Cramer
BY
A. D. T. Libby
ATTORNEY

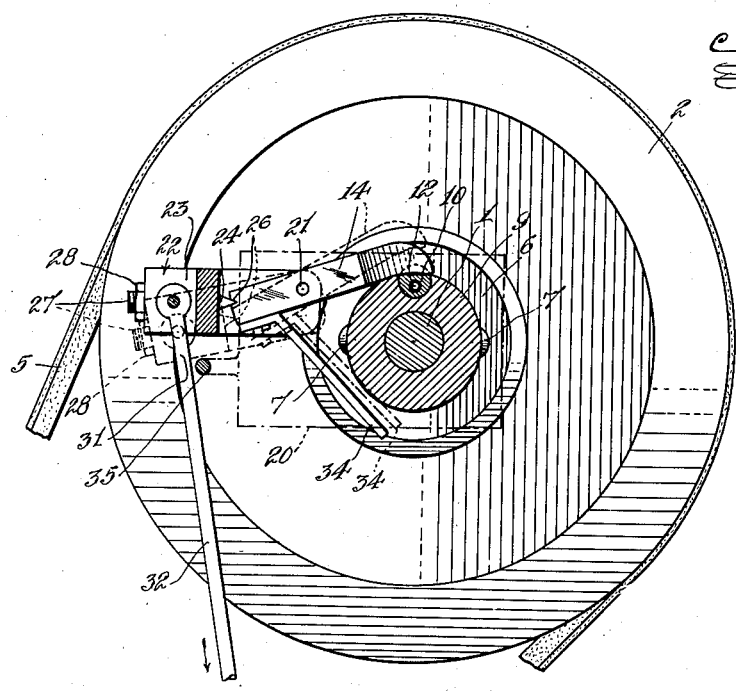
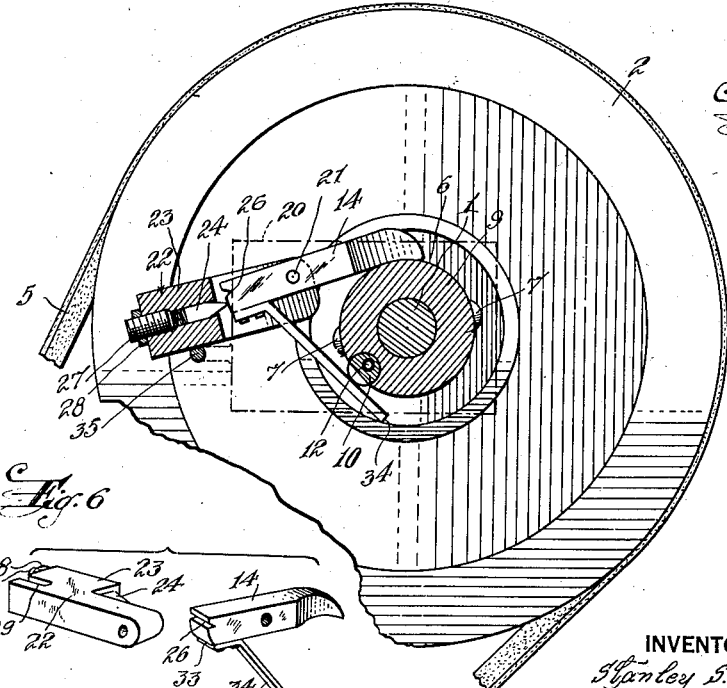
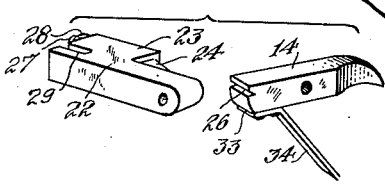
INVENTOR
Stanley S. Cramer
BY
A. D. T. Libby
ATTORNEY Patented Oct. 14, 1941

2,259,297

UNITED STATES PATENT OFFICE 2,259,297

FABRICATING MACHINE SAFETY CLUTCH

Stanley S. Cramer, Haddon Heights, N. J., assignor of one-half to Elmer G. Van Name, Haddonfield, N. J.

Application July 27, 1940, Serial No. 347,843

12 Claims. (Cl. 192—25)

This invention relates to a safety clutch especially adapted for use in connection with machines used in fabricating or assembling individual parts into what may be termed units.

It is the principal object of my invention to provide a simpler and therefore cheaper type of safety clutch, yet one that is highly effective in its operation.

In certain types of machines it is absolutely necessary that only one operative cycle be made for each revolution of the main drive shaft of the machine, and that the parts which actuate the fabricating mechanism be positively stopped at or before the main drive shaft completes one revolution or one cycle operation of the machine.

In order that my invention be better understood, I have chosen to illustrate it in connection with a rivet-setting machine such as shown and described in my application Serial No. 346,457, filed on July 20, 1940.

In the drawings accompanying this application:

Figure 1 is a plan view, certain parts being shown in section, of the drive end of a fabricating machine.

Figure 2 is a part-sectional, part-elevational view on the line 2—2 of Figure 1.

Figure 3 is a view on the line 3—3 of Figure 1.

Figure 4 is a view on the line 4—4 of Figure 1.

Figure 5 is a view similar to Figure 4, but showing the parts in a different position of the operative cycle.

Figure 6 is a perspective view of the compound control lever, the parts being separated.

In the various views, wherein like numbers refer to corresponding parts, I is the main crank or power shaft of the machine. A flywheel 2 is held in place on the end of the shaft in any satisfactory manner, as by a washer and stud 3 so the flywheel 2 may rotate freely on the shaft. The flywheel is provided with some means of driving it, such as a V-type groove 4, to receive a belt 5 operatively connected to a motor, not shown, carried on the standard or frame part of the machine. The flywheel 2 has a centrally located recess 6 within which are, arcuately spaced, one or more driving pins 7, two being shown spaced 180° apart.

Fastened to the shaft 1 in any satisfactory manner, as by a strong set screw or taper pin 8, is a sleeve-type member 9 which has an arcuate recess therein for carrying a clutch pin 10. The sleeve 9 carries a plate 11 which may be fastened thereto in any satisfactory manner as by screws 36. Resting against the inner surface of the plate 11, is a spring 12 which engages the end of the clutch pin 10 or is preferably positioned in a bore in the pin 10 as shown in Figure 2. The upper or exposed periphery of the pin 10 has a cam surface 13 cut therein to receive the cooperating cam surface on a lever member 14. A guide pin 15 is fastened to the clutch pin 10 and projects through a slot 16 in what may be termed a flange portion 17 of the sleeve 9. The guide pin 15 thus holds the clutch pin 10 in a definite arcuate position, so the cam surfaces 13 of the pin 10 and lever 14 will always be in proper position for cooperative function.

As shown in Figures 1 and 2, the end 18 of the pin 10 is held withdrawn from the path of engagement of the driving pins 7 carried by the flywheel 2, but when the pin 10 is released, as will be later described, the spring 12 will push the clutch pin 10 toward the flywheel and into the path of movement of one of the driving pins 7, one or more of which may be used. If only one driving pin 7 is used, the operation will be slowed down somewhat as the clutch pin 10 might be released just after it left the axial alignment of the pin 7, and there would be no actuation of the shaft 1 of the machine until the clutch pin is turned nearly a whole revolution to engage the pin 7.

Carried on a frame member 19 of the machine, is a support member 20 which carries a bolt or pin 21, on which is pivoted a compound lever having two parts, 22 and 14, to which reference has previously been made. The lever portion 22 has a portion 23 projecting or overlapping the inner end of the lever 14. This projecting portion 23 has a bore in which is positioned a plunger 24 which is pressed by a spring 25 into engagement with a groove 26 in the end of the lever 14, the end of the plunger and the groove 26 being formed so as to function as will be hereinafter described.

The compression of the spring 25 is regulated by a set screw 27 held in position by a locking device 28. This same end of the lever 22 is slotted at 29, and in this slot is held, by a pin 30, the end 31 of a control rod or device 32 which goes down to the foot-pedal of the machine. The end of the lever 14, adjacent the groove 26, is somewhat arcuately formed at 33 to provide a traveling surface for the end of the plunger 24. Also, the lever 14 is provided with an arm 34 which is adapted to contact with the outer periphery of the sleeve 9 and be engaged by the outer surface of the pin 10 as this is rotated with the shaft 1.

Coming now to the operation of my improved type of clutch, when the operator presses down on the foot pedal or actuates a suitable lever for moving the control rod 32 to put the machine into operation, the rod 32 moves downwardly in the direction of the arrow, which action will simultaneously move both the levers 22 and 14 so that the outer end of the lever 14 moves to disengage the cam surfaces 13 between the end of the lever and the clutch pin 10, allowing the pin 10 to be pressed toward the flywheel as heretofore described, and into the path of movement of the driving pin 7. As soon as these pins engage, the flywheel will pick up the shaft 1 and start turning it and operating the parts connected thereto. When the lever 14 is moved to the dotted position shown in Figure 4, the stop arm 34 moves to the dotted position shown in Figure 4, into contact with the outer periphery of the sleeve 9.

Assuming that the operator still has the control lever 32 moved to the starting position, the compound lever parts will be held in normal alignment until the flywheel has rotated to the position shown in Figure 5, at which time the outer surface of the pin 10 engages the stop arm 34 and will move the lever 14 back to clutching position, as shown in Figure 5, causing disengagement between the end of the plunger 24 and the groove 26 in the end of the lever 14. Consequently, when the clutch pin 10 moves around to the position shown in Figure 1, it will engage the cam surface on the end of the lever 14 and will be moved out of engagement with the driving pins 7 in the flywheel. However, it is to be understood that if the operator immediately releases the control rod 32, after starting the cycle of operation, the two lever portions 22 and 14 will remain in engaging position, with the lever 14 in declutching position.

In order that the lever 22 may not, for some reason, be moved too far, the support member 20 may carry a stop arm 35 which extends under the end of the lever 22. Since the arm 34 acts as a stop and return arm for the lever 14, no additional stop for this arm need be provided on the supporting member 20.

The structure herein described is a simple one that is cheap to manufacture, yet one that is highly efficient in its operation of the fabricating machine, and while certain of the details may be varied in their precise construction, all such variations are considered to come within the spirit of my invention and the scope of the appended claims, for example, the sleeve 9 may be made integral with the shaft 1 but for ease in manufacture, I prefer to make it separate.

What I claim is:

1. For a fabricating machine having an operating shaft and a normally, free-running drive-wheel thereon, and a clutch mechanism with means for operating it for causing driving engagement between the drive-wheel and the shaft; said clutch mechanism including a memer fastened to the shaft adjacent the drive-wheel, a clutch pin carried by said member in a partially exposed position on a part of the outer surface of said member, the exposed part of the clutch pin having a cam surface, a spring acting on the pin tending to move the pin toward the drive-wheel, a guide pin carried by the clutch pin and positioned in a slot in said clutch-pin-carrying member for the purpose described, a driving stud on the drive-wheel positioned to be engaged by said clutch pin when released, a stationary support member and a compound lever having two parts pivotally mounted on said support; one part being connected to a control member while the other part is operatively connected to the first part by releasable engagement means and extends into engagement with the cam surface on the clutch pin, the engagement between said two parts being normally sufficient to allow the second part of the compound lever to be moved by the first part out of the path of movement of the clutch pin, and an arm carried by said second part so as to be engaged by the clutch pin as the shaft turns to release said engagement means and move the second part to locking position substantially as described.

2. A clutch mechanism for a fabricating machine having a normally free-running drive-wheel carried on a main operating shaft; said clutch mechanism including a flanged sleeve fastened to the shaft of the machine, the flange being positioned closely adjacent said drive-wheel and carrying a clutch pin which has a portion located in the flange and a portion exposed in part on the periphery of the sleeve, the exposed portion of the pin having a cam surface formed therein, the flange having a slot, a guide pin fastened to the clutch pin and extending through said slot for the purpose described, a spring carried by said sleeve and acting on the clutch pin to urge it toward the drive-wheel, at least one drive pin carried by the drive-wheel in position to be engaged by the clutch pin when released, a support member and a compound lever pivoted on the support member, one part of the said lever having an end formed and extending into engagement with the cam surface on the clutch pin and normally holding the clutch pin in declutching position, another part of said lever being connected to a control rod, automatic engaging and disengaging means connecting the two parts of the lever, the said means being operable to allow the first-mentioned lever part to be moved, on actuation of the control rod, out of the path of the clutch pin to allow said spring to move the clutch pin into operative relation with said drive pin, and means carried by said first-mentioned lever part and acted on by a part of said clutch pin as it is arcuately moved by the drive pin to move this part of the lever to cause disengagement of the two parts thereof, if the control rod is still held in machine-starting position, and thereby cause the first-mentioned part of the lever to move into position to engage and release the clutch pin from clutching position on completion of a revolution of said shaft.

3. For a fabricating machine having an operating shaft and a normally free-running drive-wheel thereon, and a clutch mechanism with means for operating it for causing driving engagement between the drive-wheel and the shaft; said clutch mechanism including a member fastened to the shaft adjacent the drive-wheel, a clutch pin carried by said member for engaging a part on the drive-wheel, a fixed support, a compound lever pivoted to said support, said lever having a part operatively connected to a control device for starting the machine, and another part extending into engaging position with the clutch pin to normally hold it in declutching position, the two parts of the lever being operatively connected by releasable means, an arm carried by the second-mentioned lever part and moved toward said pin-carrying member when the entire lever is moved to release the clutch pin, said arm being actuated by contact with said clutch pin, on rotation of said shaft and pin-carrying member, to move its lever part to separate the two parts of the lever by said releasable means, provided the control device is held in machine-starting position, whereby the part carrying the arm will be forced into position to move the clutch pin to declutching position toward the end of the one revolution of said shaft.

4. A clutch mechanism as set forth in claim 3, further defined in that said releasable means comprises a resiliently mounted plunger in one lever part engaging a detent in the other lever part.

5. A clutch mechanism as set forth in claim 3, further defined in that said releasable means comprises a plunger resiliently and adjustably mounted in that part of the compound lever to which the control device is attached, the outer end of the plunger having an edge to engage a cooperative detent in the lever part carrying the arm.

6. A clutch mechanism as set forth in claim 3, further defined in that the clutch pin is partially exposed on the outer surface of the said member carrying it and this exposed portion has a cam surface engaged by a cooperative surface on the lever part carrying the arm, the arm being engaged by the exposed part of said clutch pin shortly after it moves to clutching position.

7. A clutch mechanism as set forth in claim 3, further defined in that both parts of the compound lever have a common pivotal bearing.

8. A clutch mechanism as set forth in claim 3, further defined in that said fixed support carries a stop for limiting the movement of at least that part of the compound lever which is moved by the said control device.

9. In a clutch mechanism for controlling the operation of a fabricating machine having a shaft and a normally free-running drive-wheel on the shaft; clutch means carried by the shaft for engaging a part on the drive-wheel, a pivoted lever for controlling said clutch means, an arm carried by said lever for restoring it to declutching position under a certain condition of operation as described, a second pivoted lever connected to a starting device, and resiliently actuated means for interconnecting the two levers so actuation of said starting device will move both levers simultaneously to release said clutch means, but allowing the first-mentioned lever to be returned automatically to declutching position on rotation of said shaft independently of the position of the second-mentioned lever the first-mentioned lever arm extending toward the shaft, and means operated by the shaft for engaging said arm to produce the automatic action described.

10. A clutch mechanism as defined in claim 9, further defined in that one end of the second-mentioned lever overlaps the corresponding end of the first lever and this overlapping end carries said resiliently actuated means comprising, a plunger, a spring and an adjusting screw, the plunger having an end to fit a detent in the first-mentioned lever.

11. A clutch mechanism as defined in claim 9, further defined in that both of said levers are pivoted on the same stud, and further defined in that the said means operated by the shaft for engaging said arm on the first-mentioned lever is an element of said clutch means which engages said arm shortly after the clutch means engages said part on the drive-wheel, to return said lever to declutching position whereby said lever engages said clutch means near the end of the revolution of said shaft, and withdraws it from engaging with the drive-wheel.

12. A clutch mechanism as set forth in claim 9, further defined in that said clutch means includes a sleeve fastened to the shaft and carrying a clutch pin having a cam surface positioned so as to be engaged by a part of said first pivoted lever, the sleeve also carrying resilient means for moving the clutch pin to clutching position and a guide pin for holding the clutch pin in proper arcuate relation to the lever.

STANLEY S. CRAMER.